Aug. 14, 1951  F. N. GRASBERGER  2,564,003
MACHINE FOR MAKING WOODEN HEELS
Filed Oct. 10, 1949  3 Sheets-Sheet 1
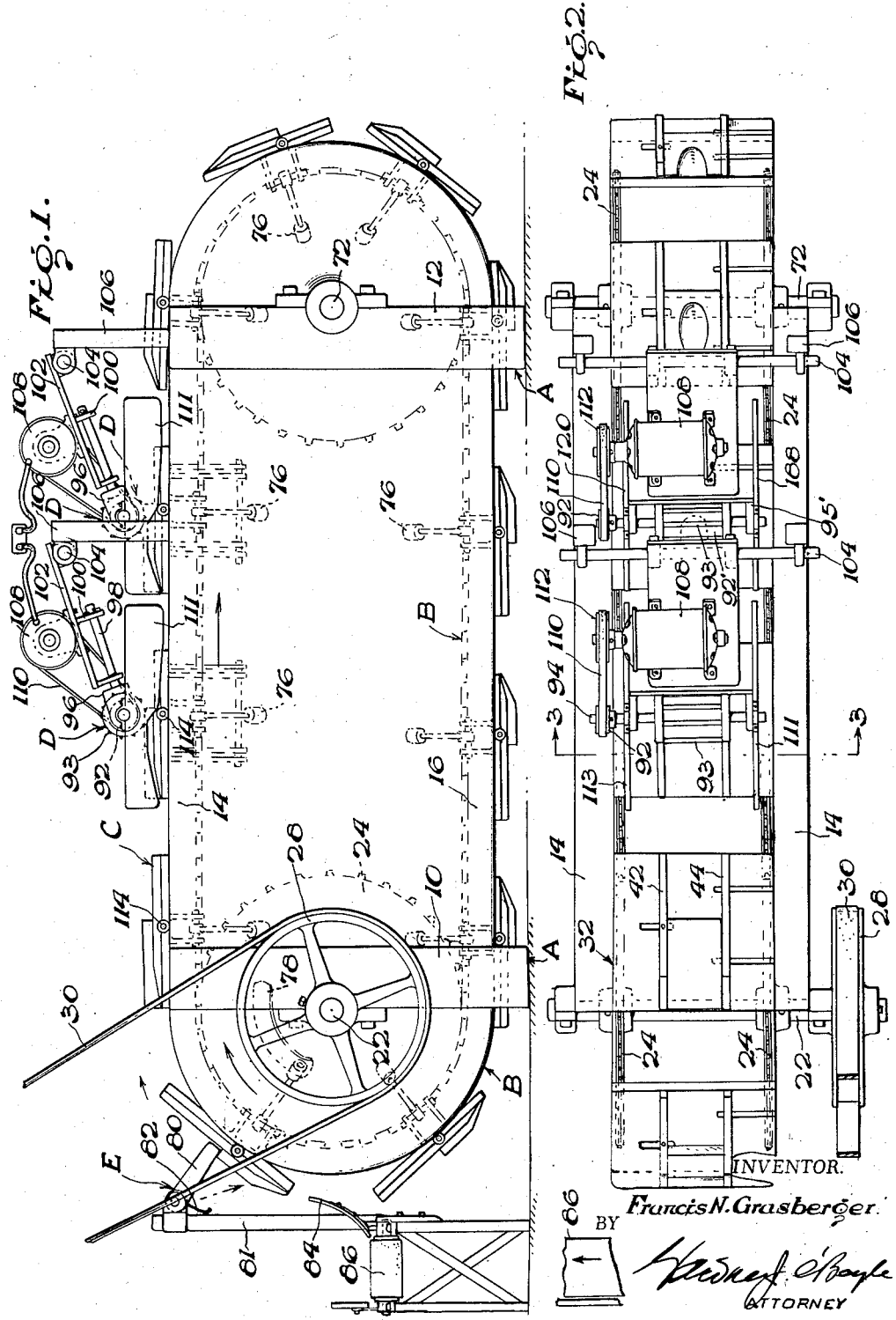
INVENTOR.
Francis N. Grasberger
BY
ATTORNEY Aug. 14, 1951     F. N. GRASBERGER     2,564,003
MACHINE FOR MAKING WOODEN HEELS
Filed Oct. 10, 1949     3 Sheets-Sheet 2
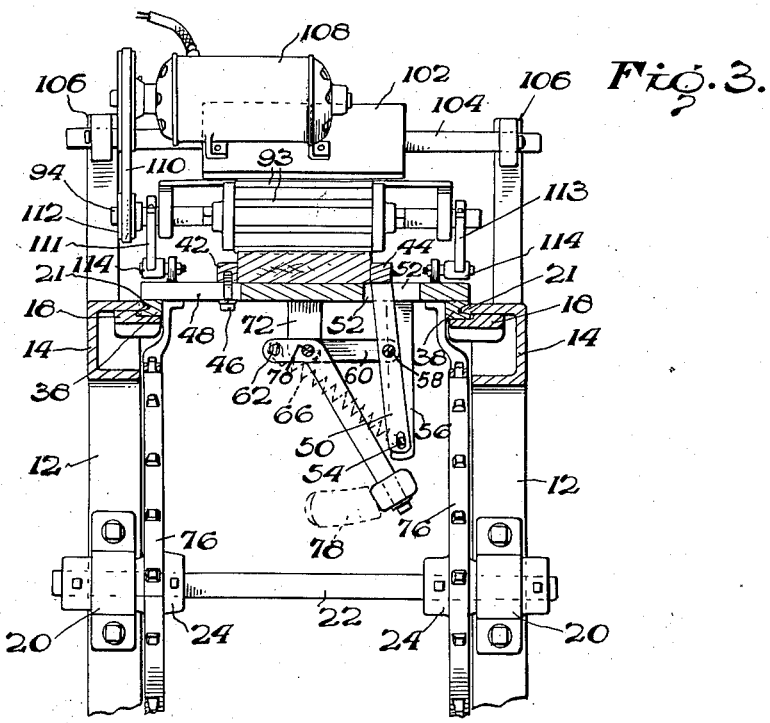
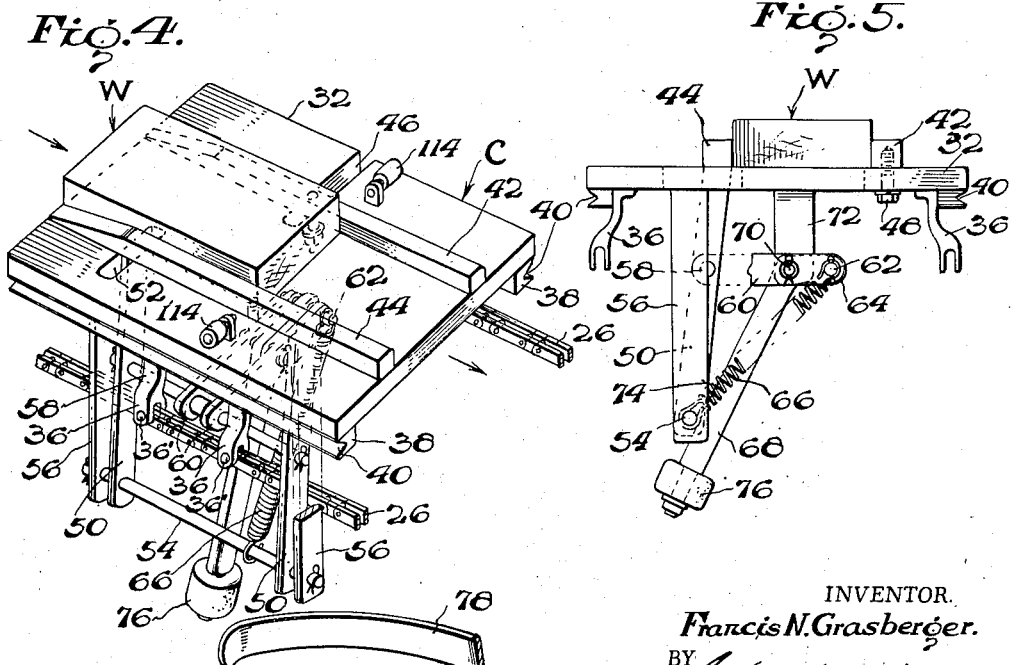
INVENTOR.
Francis N. Grasberger.
BY
ATTORNEY Aug. 14, 1951     F. N. GRASBERGER     2,564,003
MACHINE FOR MAKING WOODEN HEELS
Filed Oct. 10, 1949     3 Sheets-Sheet 3

INVENTOR.
Francis N. Grasberger.
BY
ATTORNEY

Patented Aug. 14, 1951

2,564,003

UNITED STATES PATENT OFFICE 2,564,003

MACHINE FOR MAKING WOODEN HEELS

Francis N. Grasberger, Lynchburg, Va.

Application October 10, 1949, Serial No. 120,493

9 Claims. (Cl. 12—46)

The present invention relates to wood working machines and more particularly to a machine for performing certain cutting and shaping operations in the manufacture of wooden heels.

It is recognized that machine cutting and shaping of wooden heels is not new, but heretofore the operations have been carried out on machines of a complex character, whereas the present invention contemplates an extremely simple machine designed to cut and shape a larger number of blocks, with less fatigue to the operator than can be accomplished in the same period of time with existing machines of a more complex character.

An object of my invention is to provide an improved machine for cutting and shaping wooden heels, wherein the block is successively arched and concaved, with a single handling by the operator.

Another object of my invention is to provide a machine for cutting and shaping wooden heels, wherein the work piece or heel blank is accurately and firmly held in fixed position throughout the operations, thus assuring a smooth cut with minimum wastage.

Still another object of my invention is to provide a machine for performing certain cutting and shaping operations in the manufacture of wooden shoe heels, wherein wastage due to splitting is substantially completely eliminated.

Yet another object of my invention is to provide a machine for cutting and shaping wooden heels, wherein adjustments may be quickly and easily made to provide for specifically different cuts.

A further object of my invention is to provide a machine adapted to cut or form the heel block in such a manner that both the inside and outside lines of the finished heel properly fit the shoe.

A still further object of my invention is to provide a machine for performing certain cutting and shaping operations in the manufacture of wooden shoe heels, having improved means for conveying a work piece or heel blank to the cutter device, together with means for rigidly holding the blank on the conveyor.

In the drawings:

Figure 1 is a side view of a machine incorporating the invention herein;

Fig. 2 is a plan view of Fig. 1;

Fig. 3 is a view taken on line 3—3 of Fig. 2;

Fig. 4 is a perspective view of one of the work carriers;

Fig. 5 is a detail view of the carrier jack or clamping means;

Figure 6:
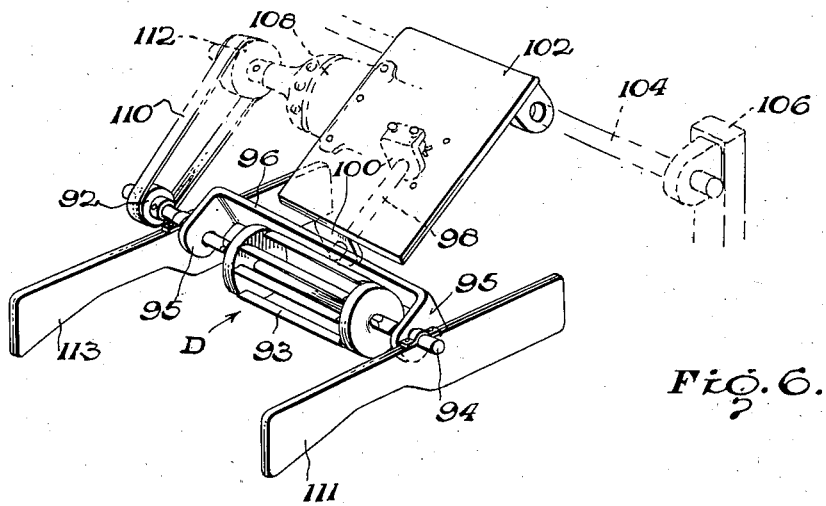
Fig. 6 is a perspective of one of the cutting devices.

Referring to the drawings, the machine comprises generally a supporting frame A, an endless conveyor B, carriers C, cutters D and ejecting means E. The work upon which the operations are to be performed is initially fed onto a carrier C in advance of the cutters D, and thereafter fed past them by the conveyor B and finally removed by the ejector E.

More specifically the supporting frame A includes spaced rectangular side members each having longitudinally spaced legs 10 and 12 interconnected by horizontal top and bottom longitudinals 14 and 16. These latter members are U-shaped with the channel facing inwardly and having secured thereto a carrier guide rail or track 18 (Fig. 3). The member 18 faces upwardly on the top longitudinal and downwardly on the bottom longitudinal, their cooperative action with respect to the carriers will be described more fully hereinafter.

Supported in suitable bearings 20 on each pair of vertical legs 10 and 12, is a transverse shaft 22, carrying spaced sprockets 24 for driving the conveyor B which consists of endless sprocket chains 26. The conveyor is operated by providing a suitable pulley 28 on one of the shafts 22, and connecting it by means of a belt 30 to a master power shaft, not shown. The conveyor B moves the carrier C in an endless path, and to accomplish this, each carrier includes a rectangular work supporting table or carriage 32, Figs. 4 and 5, having a plurality of depending connecting arms 36, each terminating in a bifurcated end which straddles a link of the sprocket chain 26 and is connected thereto by pins 36'. To retain the carriage 32 in a horizontal plane as it passes under the cutters it has secured to its under surface longitudinal side rails 38 adapted to ride on the frame guide rails 18 (Fig. 3). Furthermore, each rail 38 has a V-shaped groove 40 for receiving the V-shaped edge 21 of the channel member, thus preventing any wobbling of the carriage in a horizontal plane. Although not shown, the lower frame members 16 are of like construction to the upper member, whereby the carriers are retained in guided position during their reverse travel.

Figure 7:
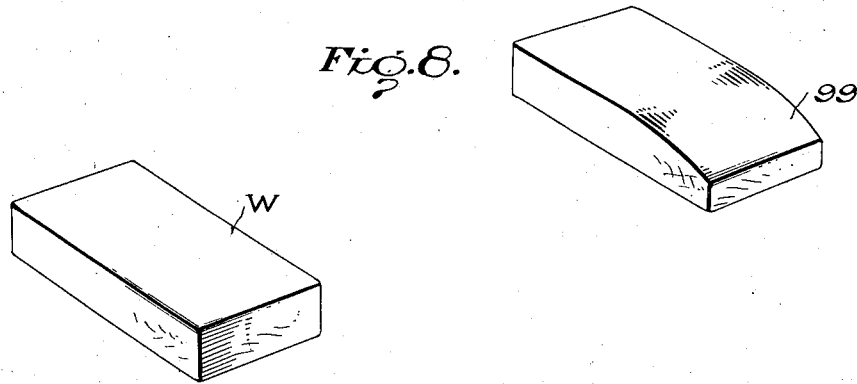

Each of the carriages 32 is adapted to receive a work piece W, here shown as a rectangular block (Fig. 7), to be cut and shaped into a wedge heel, it being understood that this type is shown for illustration only as other types can be shaped in like manner.

In order to firmly hold the work piece or block W in position, each carriage 32 includes jack or clamping means consisting of a normally stationary but adjustable member 42 and a transversely spaced movable member 44, each member being rectangular in cross-section and extending longitudinally of the length of the carriage (Figs. 3 to 5). The spacing between the members may be increased or decreased as desired by shifting the member 42 to an adjusted position. To accomplish this, the carriage has a transverse slot 46 therein, through which a clamping bolt 48 extends. The bolt 48 is screw-threaded into member 42 for securing it into any desired position.

The movable member 44 is fixed to the upper ends of a pair of longitudinally spaced arms 50 which depend angularly and outwardly through transverse slots 52 in the carriage and are secured at their lower ends to a shaft 54, pivotally mounted in arms 56 depending vertically from and rigid with the carriage 32. To operate jack member 44 from open to closed position, the arms 50 are interconnected intermediate of their ends by a cross-member 58 on which there is pivotally mounted the outer ends of a pair of spaced parallel links 60. The inner ends of the links 60 are mounted on a pin 62 on which there is also pivotally mounted the short arm 64 of a bell crank lever 66 (Fig. 5), this lever 66 having a long or actuating arm 68 at an obtuse angle to the short arm. The lever 66 is pivotally mounted at the intersection of the arms on a pin 70 supported between a pair of hangers 72 depending from the carriage 32. This linkage is normally held in a position to retain the member 44 in locking or holding position by means of a spring 74 connected at one end to the pin 62 and at the other to shaft 54.

To open the clamping means, the lower end of crank arm 68 is provided with a roller or cam follower 76 adapted to engage a cam 78 carried on the frame A in any suitable manner. The cam is so designed that when engaged by follower 76, the crank arm 68 will be pivoted inwardly to raise the pin 62 against the tension of spring 74, moving the links 60 and carrier arms 50 outwardly and move member 44 to open position. Since the shaft 54 is positioned angularly and outwardly of member 44, and the arms 50 are longer than the vertical distance from the carriage to the shaft 54, the member 44 will move in an arc upwardly and outwardly from the carriage 32. Obviously when roller 76 moves out of engagement with cam 78, spring 74 will bias the parts back to closed or clamping position, the member 44 then moving downwardly and inwardly. This movement of member 44 is important for it results in positively forcing the block W downwardly against the carriage where it becomes rigidly seated. Moreover, the block is firmly clamped throughout its length by the vertical faces of the clamping members, this rigid engagement of the block assuring a smoother cut and preventing splitting.

As best seen in Fig. 1, cam 78 is located adjacent ejecting means E. Just prior to the release of the clamping means, the work will be engaged by the ejecting means, including a kicker 80 which is pivotally mounted on an upright 81, and is normally biased in a clockwise direction by a spring 82. The kicker, upon initial engagement by the work piece, will be pivotally moved to tension the spring 82, and cam 78 will move crank 66 to release the holding means, the work then being ejected onto a slide 84 feeding it to a takeaway conveyor 86.

Referring to Figs. 1 to 3, a block W is fed onto the carriage with its rear edge in alignment with the rear edge of the carriage, whereupon the clamping means will close and secure it in position. The block is conveyed to the first cutting zone D where there is provided a transverse rotary cutter 92, having a plurality of cutting edges 93, the cutter being mounted on a shaft 94 pivotally supported in the spaced arms 95 of a supporting yoke 96 (Fig. 6). The yoke 96 is fixed to the outer end of a shaft or pinion 98 extending at right angles from the cutter shaft from the center of the yoke, the shaft 98 being pivotally mounted in the depending arms 100 of a yoke supporting arm 102, whereby the cutter may be rocked or tilted angularly in a plane perpendicular to the carrier. The arm 102 is in turn pivotally mounted at its end, remote from the cutter on a shaft 104 extending transversely of the machine and supported in suitable bearings arranged on uprights 106 carried by the side frame members. The arm 102 may be shifted transversely of shaft 104 to properly center the cutter, and when in proper position, secured in place by set screws or other suitable locking means. With this arrangement, the cutter may move vertically in the same plane in which it may be angularly rocked, thus giving it a compound movement for reasons to be described hereinafter.

The cutter 92 is driven by a motor 108 supported on the arm 102, and connected through a drive belt 110 to a pulley 112 on the cutter shaft 94. With the motor so mounted, there is sufficient weight to keep the cutter in engagement with the work piece without the use of springs or other means.

The desired cut or shaping of the blank is obtained by controlling the position of the cutter and shifting it as desired rather than shifting the work piece. To accomplish this, there are provided a pair of cams 111 and 113, removably secured in any suitable manner on the yoke arms 95 to each side of the cutter. These cams are engaged by cam followers 114, secured to the top of the carriage, and the shape of the cut is controlled by the cooperative action of the cam and follower.

Figure 8:
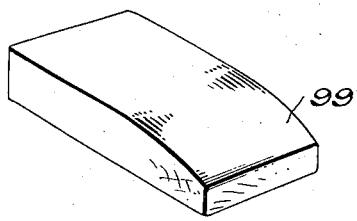
Figs. 7, 8 and 9 are views of a work piece prior to cutting, and after passing through the successive cutting zones.
Figure 9:
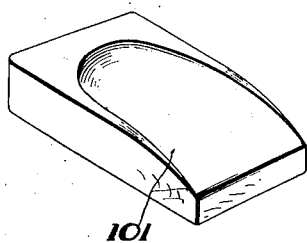

As previously stated, the blocks W are rectangular (Fig. 7), and are to be shaped as wedges. Referring to cam 111 (Fig. 1), it will be seen that the cutter is initially lifted above the block, then set into engagement therewith to the rear of the leading edge, and thereafter lowered progressively to curve the block downwardly, and form the arch portion 99 (Fig. 8). After this cut is completed, the block is then moved under the second cutter or shaper 92', which consists of parts identical to the first cutter 92, except for the shape of cams 118 and 120, and the shape of the cutter edges 95'. Here the cutter 92' is lowered into engagement with the block to the rear of the leading edge thereof, and thereafter the cutter shapes the desired concavity 101 (Fig. 9).

A particular advantage of having the cams control the cutter is that shaping at a desired angle may be obtained. If for example, it is desired to have the outer edge of the heel higher on one side than the other, it is only necessary to vary the depth of the cams. In this way, the cutter will be pivoted about the shaft 98 and the desired angular cut obtained. Moreover, as the cutter engages a solidly supported block, and not one that is suspended, a planing action is obtained resulting in an extremely smooth cut with a minimum of roughage and splitting. It will also be seen that rapid adjustment of the machine to perform different cuts may be quickly and easily accomplished, as it is only necessary to remove and replace the cams. In this way, duplication of complete units for operation on different types of heels is avoided, thus greatly enhancing the utility of the machine.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. In a machine of the character described, a carriage for supporting a work piece for continuous movement in a horizontal plane, means for rigidly holding a work piece on the carriage, a transversely arranged cutting device lying in the path of movement of the carriage, means supporting said cutter for transverse tilting and vertical movement, cam means carried by said cutter supporting means and follower means on said carriage for engaging said cam means.

2. In a machine of the character described, a carriage for supporting a work piece for continuous movement in a horizontal plane, a transversely arranged cutting device lying in the path of movement of the carriage, means supporting said cutter for transverse tilting and vertical movement, and co-operating means on the carriage and cutter for moving the cutter to desired cutting positions.

3. In a machine of the character described, a carriage for supporting a work piece for continuous movement in a horizontal plane, a transversely arranged cutting device lying in the path of movement of the carriage, means supporting said cutter for transverse tilting and vertical movement, cam means carried by said cutter supporting means and follower means on the carriage for engaging said cam means.

4. In a machine of the character described, a carriage for supporting a work piece for continuous movement in a horizontal plane, a rotary cutter, means supporting said cutter with its axis transversely of and in the path of movement of the carriage, said cutter supporting means being vertically and pivotally movable in a plane perpendicular to the carriage, and co-operating means on the carriage and cutter for moving the cutter to desired cutting positions.

5. In a machine of the character described, a carriage for supporting a work piece for continuous movement in a horizontal plane, a yoke transversely arranged of and in the path of the carriage and having a longitudinally extending arm intermediate of its ends, a transversely pivoted lever in which said yoke arm is pivoted, and a rotary cutter mounted in said yoke.

6. In a machine of the character described, a carriage for supporting a work piece for continuous movement in a horizontal plane, a rotary cutter, means supporting said cutter with its axis transversely of and in the path of movement of the carriage, said cutter supporting means being vertically and pivotally movable in a plane perpendicular to the carriage, and co-operating means on the carriage and cutter supporting means for moving said supporting means.

7. In a machine of the character described, a carriage for supporting a work piece for continuous movement in a horizontal plane, a yoke transversely arranged of and in the path of the carriage and having a longitudinally extending arm intermediate of its ends, a transversely pivoted lever in which said yoke arm is pivoted, a rotary cutter mounted in said yoke, and co-operating means on the carriage and yoke for pivoting said yoke and lever.

8. In a machine of the character described, a carriage for supporting a work piece for continuous movement in a horizontal plane, means for rigidly holding a work piece on the carriage, a transversely arranged cutting device lying in the path of movement of the carriage, first means supporting said cutting device for transverse tilting movement, second means supporting said last means for substantially vertical movement, cam means carried by said first cutter supporting means, follower means on said carriage for engaging said cam means, means for automatically releasing said work piece holding means and means for ejecting the supported work upon release of the holding means.

9. In a machine of the character described, a movable carriage for supporting a work piece, means for maintaining the supported work piece in a fixed position on the carriage, a cutter lying in the path of movement of the supported work piece, means supporting the cutter for vertical and angular movement in a plane perpendicular to the carriage, and co-operating cam and follower means on the carriage and cutter for moving the cutter to desired cutting positions.

FRANCIS N. GRASBERGER.

REFERENCES CITED

The following references are of record in the file of this patent:

UNITED STATES PATENTS

| Number | Name | Date |
|---|---|---|
| 1,429,309 | Whipple | Sept. 19, 1922 |
| 1,807,216 | Johnson | May 26, 1931 |
| 2,026,040 | Howe | Dec. 31, 1935 |
| 2,026,042 | Howe | Dec. 31, 1935 |
| 2,045,390 | Howe | June 23, 1936 |